H. A. FITZPATRICK.
AIR VALVE.
APPLICATION FILED MAY 27, 1907.
944,024.
Patented Dec. 21, 1909.
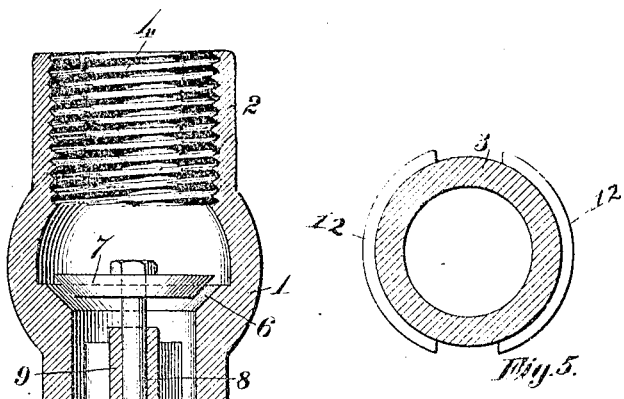
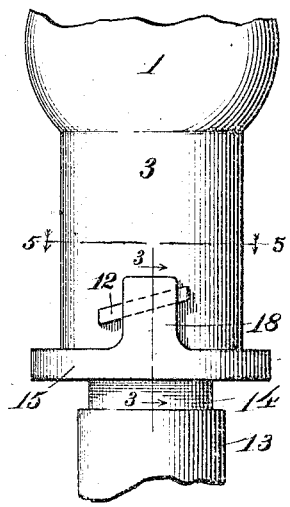
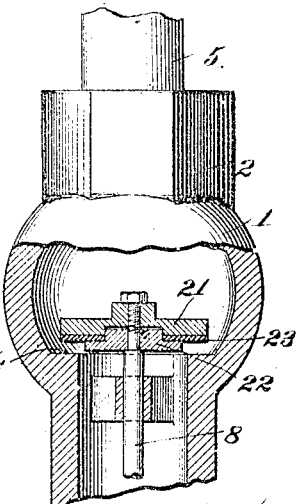
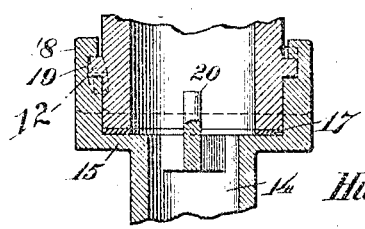
Witnesses:
Inventor:
Hugh A. Fitzpatrick
by
Joshua R. H. Potts
Att'y.

UNITED STATES PATENT OFFICE.

HUGH A. FITZPATRICK, OF CHICAGO, ILLINOIS.

AIR-VALVE.

944,024.

Specification of Letters Patent.  Patented Dec. 21, 1909.

Application filed May 27, 1907.  Serial No. 375,802.

*To all whom it may concern:*

Be it known that I, HUGH A. FITZPATRICK, a citizen of the United States, residing at 790 West Thirty-seventh street, in the city of Chicago, county of Cook, and State of Illinois, have invented certain useful Improvements in Air-Valves, of which the following is a specification.

My invention relates to valves and has particular reference to air valves.

The object of my invention is to provide a simple and efficient combined valve and coupling for air pipes wherein the valve is automatically opened or closed as a hose pipe is attached to or detached therefrom.

My invention will be more fully understood by reference to the accompanying drawings forming a part of this specification and in which, Figure 1 is a sectional view of a valve casing and hose coupling, equipped with a valve and valve operating device embodying my invention. Fig. 2 is an elevation of a portion of the same, illustrating the locking device. Fig. 3 is a section upon the line 3—3 of Fig. 2. Fig. 4 is a detail illustrating a modified form of air valve and Fig. 5 is a cross section upon the line 5—5 of Fig. 2 showing a slight modification.

Referring to the drawings, 1 indicates a valve casing. This is substantially spherical and is provided with the extending portions, 2 and 3 by which it is attached to the air pipe and a hose coupling, respectively. The portion, 2 is internally threaded as at 4 to receive the air pipe, 5. Within the valve casing, 1, is a valve seat, 6, for the valve, 7.

As shown in Fig. 1, the valve consists of a conical metallic member, mounted upon the end of a valve stem, 8. 9 indicates a bearing for the valve stem arranged within the portion, 3. The valve stem is quite long and is provided with a collar, 10, between which and the bearing, 9, is arranged a spring, 11, which tends to keep the valve, 7, closed. The portion, 3 is cylindrical and is provided upon its outer face with cam flanges, 12, by which the hose coupling is attached thereto.

The coupling proper, which is attached to the end of a hose, 13, comprises a cylindrical hose attaching portion, 14 and a disk portion, 15. The disk portion, 15, is provided with a seat, 16, to receive the end of the portion, 3 of the valve casing, and a washer or gasket, 17, is provided to make an air tight joint therebetween. Upon each side of the disk portion, 15, is a lug, 18, provided with a notch or groove, 19 to receive the cam flange 6, upon the cylindrical portion, 3. These cam flanges may be short as shown in Figs. 1 and 2, or they may extend nearly around the cylindrical portion, 3, as shown in Fig. 5, leaving but space enough for the passage of the lugs, 18.

Within the cylindrical portion, 14, of the hose coupling, I arrange a perforated partition or spider, and upon this provide a lug or pin, 20. As the coupling is screwed upon the depending portion, 3 of the valve casing, the pin, 20 engages the end of the rod, 8, shoving the same upwardly, opening the valve. When the hose is disconnected either accidentally or purposely, the spring, quickly seats the valve, 7, preventing the escape of air.

In Fig. 4 I have illustrated a modified form of valve which comprises a pair of disks of different diameters arranged upon the end of the rod, 8 and clamping a gasket between them. 21 indicates the upper or larger disk and 22 the lower or smaller one. These are formed as shown and clamp between them the gasket, 23, which seats upon the plan valve, seat, 24.

The construction of the rest of the valve casing and the hose coupling, together with its operation, are the same as in the afore-described modification.

Having described my invention, what I claim as new and desire to secure by Letters Patent is, In a device of the class described, a spherical valve casing having a valve seat formed in the walls thereof, and provided with cylindrical extensions arranged upon opposite sides and in axial alinement, one of said portions being internally threaded and the other extension being elongated and provided near its end with a pair of segmental cam-flanges upon its outer face, a valve stem arranged within the last said portion and having a valve at one end to engage said valve seat and a collar upon the opposite end, a bearing for said stem formed in said extension, a spring interposed between said bearing and said collar, and a hose coupling comprising a disk portion and a cylindrical portion adapted to receive the hose, said disk portion having a shallow recess to receive the end of the elongated extension, a washer in said recess, a pair of lugs extending upwardly a considerable distance from said disk forming guides for said extension and having grooves near the outer ends to receive said cam-flanges, said lugs below said grooves fitting snugly against the sides of said elongated extension and a pin fixedly arranged within the cylindrical portion of the hose coupling and extending above said disk portion to engage the end of the valve stem as the device is coupled, substantially as described.

In testimony whereof I have signed my name to this specification in the presence of two subscribing witnesses.

HUGH A. FITZPATRICK.

Witnesses:
 FRANCES E. SHEEHY,
 H. S. AUSTIN.